Feb. 19, 1952     E. P. COSKEY     2,586,455
TIRE VALVE
Filed Sept. 13, 1946
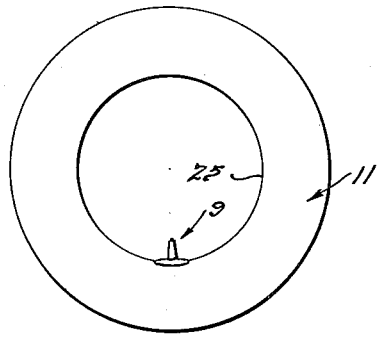
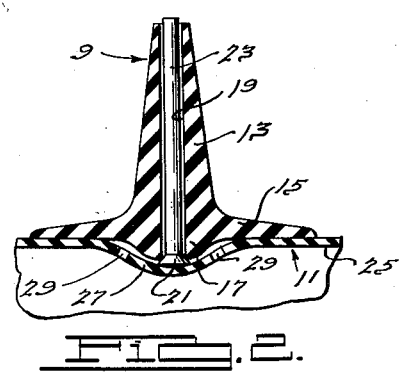
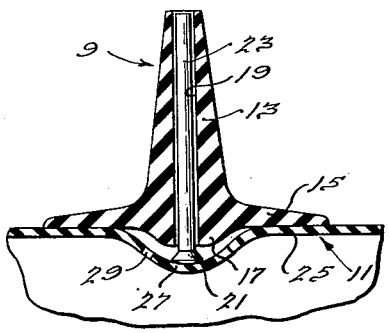
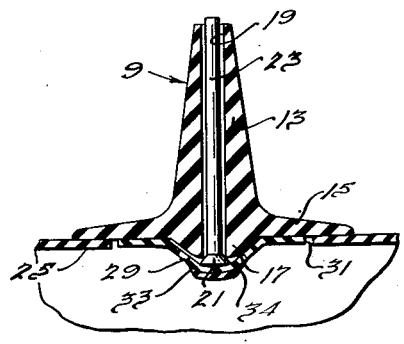
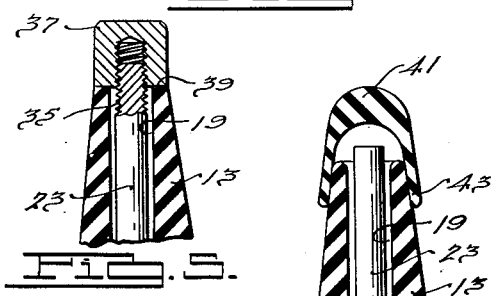
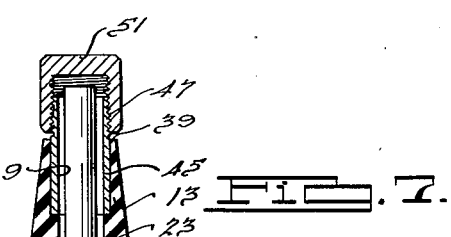
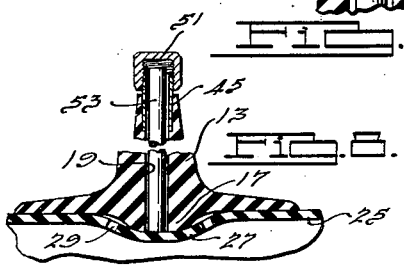
INVENTOR.
Edward P. Coskey.
BY
Harness, Dickey & Pierce
ATTORNEYS.

Patented Feb. 19, 1952

2,586,455

UNITED STATES PATENT OFFICE 2,586,455

TIRE VALVE

Edward P. Coskey, Detroit, Mich.

Application September 13, 1946, Serial No. 696,920

2 Claims. (Cl. 137—69)

This invention relates to a valve mechanism, and more particularly to a valve mechanism for use on a pneumatic tire.

The primary objects of this invention are: to provide a valve for a pneumatic tire which is extremely simple in construction; to provide a valve which may be easily replaced if torn off the tube of a tire; to provide a valve which is extremely efficient in operation due to its simple construction; to provide a valve which is cheap to construct because of the relatively few parts used therein; and to provide a valve which may be used with the standard tire pressure gauge and air hose of the type now conventionally used on automobile tires.

These and other objects of this invention will become apparent from the following detailed description taken in conjunction with the accompanying drawing, in which:

Figure 1 is a side elevational view of an inner tube for pneumatic tires with the valve of this invention mounted thereon;

Fig. 2 is a cross-sectional view of one embodiment of the valve of this invention showing the valve in a closed position;

Fig. 3 is a view of the structure illustrated in Fig. 2 showing the valve in open position;

Fig. 4 is a cross-sectional view of another embodiment of the invention;

Fig. 5 is an enlarged broken cross-sectional view of structure similar to that illustrated in Fig. 2 showing a further form of the invention;

Fig. 6 is a view of structure similar to that illustrated in Fig. 5 showing a still further form of the invention;

Fig. 7 is a view of structure similar to that illustrated in Fig. 5 showing a still further form of the invention, and Fig. 8 is a broken sectional view of structure similar to that illustrated in Fig. 2, showing a further form of the invention.

Referring now to the drawing, it will be seen that a valve generally indicated at 9 is mounted on a conventional inner tube 11 of a pneumatic tire, not shown. Referring to Figs. 2 and 3, it will be seen that a valve stem 13, made of hard rubber or any other suitable material, is provided with an integral circular flange 15 adjacent the lower end thereof. The flanged end of the valve stem 13 is formed with a protuberance or projecting seat 17 which extends below the lower surface of the flange 15. An aperture 19 extends axially through the valve stem 13 and the protuberance 17.

Positioned against the lower end of the protuberance 17 is a valve head 21, a preferred shape of which, as illustrated in the drawing, is a truncated cone. A valve head rod 23 extends upwardly from the valve head 21 through the aperture 19 and beyond the upper edge of the valve stem 13. The valve head 21 and rod 23 may be made of hard rubber, plastic, or any other suitable material. The valve head rod 23 is of a smaller diameter than the inside diameter of the aperture 19 in the valve stem to permit the passage of air therebetween.

The inner wall 25 of the inner tube 11 is vulcanized or otherwise sealingly secured to the underside of the circular flange 15 of the valve stem 13. The central portion 27 of the wall 25 which is beneath the valve stem 13 is unsecured and stretched over the protuberance 17 and the valve head so as to bias the valve head 21 against the underside of the protuberance 17 and seal the lower end of the aperture 19. Outwardly of the valve head 21, but inwardly of the flange 15, the diaphragm portion 27 of the inner tube is provided with a plurality of annularly spaced apertures 29 which communicate the aperture 19 with the inside of the inner tube 11 when the valve is open.

In the embodiment illustrated in Fig. 4, the same valve stem 13 as previously described is provided with the same flange 15, protuberance 17 on the lower end thereof, valve head 21, and valve rod 23 riding freely in an aperture 19. However, in the embodiment illustrated in Fig. 4 a circular hole 31 is cut in the inner wall 25 of the inner tube 11. This hole 31 is of such diameter that when an assembled valve unit is centered therein, the inner tube wall 25 will extend underneath only a portion of the valve stem flange 15. The valve unit is formed by vulcanizing or otherwise securing a rubber diaphragm element 31 to the inner portion of the valve stem flange 15. This element 31 is of such a size as to only cover a portion of the flange 15 and leave the outer portions thereof exposed for engagement with the wall of the inner tube. The central portion 33 of the diaphragm element 31 is unsecured and is stretched over the protuberance 17 so as to bias the valve head 21 against the underside of the protuberance 17 to seal the aperture 19 as previously described for the central portion of the wall 25 of the inner tube in Fig. 2. If desired, a reinforcing patch 34 may be vulcanized to the outside of the diaphragm element 31 to prevent weakening of the element due to contact with the valve head and provide means for aiding the biasing of the valve head, as shown in Fig. 4. The outer unexposed portion of the flange 15 of the valve stem unit can then be vulcanized or otherwise suitably secured to the wall 25 of the inner tube 11. In this way, a replaceable valve unit is provided which can be initially installed in the inner tube by the manufacturer or can be carried separately by the tire user as a replacement unit. Should the valve unit be torn out of the inner tube, or if the valve is connected to the tube in the manner illustrated in Fig. 2 and the valve torn therefrom, it is merely necessary to place a patch over the torn out portion of the tube and cut a hole therein, or in any other position of the inner wall of the tube, and revulcanize a replacement valve unit, of the type illustrated in Fig. 4, therein.

Under normal operating conditions the valve head 21 is sealed against the lower end of the aperture 19 in the valve stem, as shown in both Figs. 2 and 4, but if it is desired to remove any air from the inner tube, or to add air thereto, it is merely necessary to press down on the valve head rod 23. The valve head 21 will then push the central portion of either the inner tube or the patch away from the protuberance at the bottom of the valve stem. The air then can pass through the apertures 29 spaced around the central portion and up through the gap between the valve head rod 23 and the aperture wall 19. In this way, the air can escape from the inner tube or, if the conventional air hose is connected to the valve, the air can pass down through the aperture 19 and through the apertures 29 into the tube to add air thereto. As soon as the downwardly exerted pressure on the rod 23 of the valve head is released, the central portion of either the inner tube of Fig. 2 or the patch of Fig. 4 will force the valve head back up into sealing engagement with the protuberance 17 of the valve stem. This occurs because the central portion has been stretched and when pressure is released the rubber will contract back toward its normal position and hold the valve head firmly in place. It likewise is to be noted that the air pressure within the inner tube has no effect on the sealing of this valve. This sealing is caused entirely by the tension in the rubber which is stretched over the valve head and valve stem protuberance. The valve head 21 may be of metal, plastic, rubber or like material and may be vulcanized or molded directly to the diaphragm portion 27. Preferably the head will have the stem portion 23 provided in continuation thereof although this may be a separate element.

Referring now to Fig. 5, it will be seen that the upper end of the valve head rod 23 is threaded as at 35 and an internally threaded cap 37 is threaded thereon. It will be noted that this cap seats against the upper end 39 of the valve stem 13 and, when threaded thereagainst, will draw the valve head rod 23 axially upward, so as to insure positive sealing between the valve head and valve stem protuberance. If for any reason the diaphragm stretched over the valve head 21 does not return the valve head into complete sealing engagement with the protuberance 17, this cap will assure complete sealing of the valve head.

Fig. 6 illustrates another embodiment of a cap which may be used with the valve 9. This cap is hollow so as to have a solid head 41 and a downwardly projecting wall 43 which is adapted to fit around the outside of the upper end of the valve stem 13. The cap can be made of hard rubber, plastic, metal, or any other suitable material and is adapted merely for use as a dust cap for preventing the ingress of dust, dirt or any other like foreign material into the valve stem itself.

Referring now to Figure 7, it will be noted that that portion of the aperture 19 at the upper end of the valve stem 13 is enlarged to securely receive a sleeve 45 therein which has the upper end thereof threaded as at 47. The valve head rod 23 extends through a recess 49 in the sleeve 45, which is of the same diameter as the aperture 19 in the valve stem. By inserting the sleeve 45 into the valve stem, a conventional cap 51, identical with those used on pneumatic automobile tires today, can then be threaded over the top of the sleeve 45 to likewise prevent the ingress of dirt or other foreign material. Also it will be noted that the cap will seat against the top of the valve head rod upwardly so as to insure sealing between the valve head and valve stem protuberance as previously described. It will readily appear that any suitable type cap could be used with the valve of this invention and, while only three such caps have been shown, it is to be understood that this invention contemplates the use of many others.

In Fig. 8 a further form of the invention is illustrated, that wherein a stem 13 has a sleeve 45 therein containing a thread on which a cap 51 is secured. The central portion 27 on the wall 25 is stretched across a protuberance 17 on the stem to form the seal directly therewith. This structure differs from that illustrated in Fig. 2 in that the central portion 27 is stretched directly over the protuberance 17 to form the seal rather than applying a force to the head 21 to force the head into sealing engagement with the protuberance. Within the passageway 19 a rod 53 is positioned to project slightly from the end of the sleeve 45 when the opposite end of the rod engages the diaphragm portion 27 of the wall 25. When the tire is to be inflated or the pressure of the air therein gauged, the application of the valve stem engaging portion thereof moves the rod 53 downwardly to unseat the diaphragm portion 27 from the protuberance 17 to permit air to flow into or out of the aperture 17 depending on whether the tube is being inflated, deflated or tested for pressure. The rod 53 may be made of any suitable material, metal, plastic or the like, and is retained within the aperture 19 by the cap 51.

I claim:

1. A valve stem unit comprising a tubular stem made of moldable material having a radial flange near one end providing a protuberance on the side of the flange opposite the main stem portion through which a passageway in the stem extends, a rod in said stem, said rod having a downwardly diverging conical head engaging the protuberance at the junction of the passageway forming a seal therewith, a piece of thin resilient material secured to said flange on the protuberance side thereof outwardly of the protuberance so as to have the central portion unsecured and stretched thereover for engaging and urging said head toward said protuberance, the portion of the material between the protuberance and the secured portion having an aperture providing a passageway communicating with the passageway through the protuberance and stem when the head is moved from said protuberance.

2. A valve stem unit comprising a tubular stem made of moldable material having a radial flange near one end providing a protuberance on the side of the flange opposite the main stem portion through which a passageway in the stem extends, a rod in said stem, said rod having a downwardly diverging conical head engaging the protuberance at the junction of the passageway forming a seal therewith, a piece of thin resilient material secured to said flange on the protuberance side thereof outwardly of the protuberance so as to have the central portion unsecured and stretched thereover for engaging and urging said head toward said protuberance, said resilient material having an aperture for the passage of air to and from said stem.

EDWARD P. COSKEY.

REFERENCES CITED

The following references are of record in the file of this patent:

UNITED STATES PATENTS

| Number | Name | Date |
|---|---|---|
| 531,335 | Roth | Dec. 25, 1894 |
| 543,297 | Davis | July 23, 1895 |
| 597,655 | Rhodes | Jan. 18, 1898 |
| 597,954 | Cartwright | Jan. 25, 1898 |
| 1,309,795 | Campbell | July 15, 1919 |
| 1,957,866 | Watson | May 8, 1934 |
| 2,082,972 | Perry | June 8, 1937 |
| 2,124,909 | Crowley | July 26, 1938 |
| 2,142,708 | Becker | Jan. 3, 1939 |
| 2,219,190 | McCoy | Oct. 22, 1940 |
| 2,349,435 | Keefe | May 23, 1944 |

FOREIGN PATENTS

| Number | Country | Date |
|---|---|---|
| 22,007 | Great Britain | 1894 |